United States Patent [19]

Maxwell

[11] 3,790,988
[45] Feb. 12, 1974

[54] ANCHOR FOR HOLDING A FISH WHILE WORKING ON THE SAME

[76] Inventor: Neil J. Maxwell, 138 S. Gina Ave., El Cajon, Calif. 92021

[22] Filed: May 22, 1972

[21] Appl. No.: 255,724

Related U.S. Application Data

[63] Continuation-in-part of Ser. No. 42,820, June 2, 1970, which is a continuation-in-part of Ser. No. 761,227, Sept. 20, 1968, abandoned.

[52] U.S. Cl. .................................................. 17/70
[51] Int. Cl. .......................................... A22c 25/00
[58] Field of Search ............... 17/70, 56, 18, 66, 44

[56] References Cited
UNITED STATES PATENTS
2,863,165  12/1958  Hartman .................................. 17/70
2,974,357  3/1961  Berg ......................................... 17/70
2,587,007  2/1952  Southward et al. ..................... 17/70
2,891,275  6/1959  Schuls ...................................... 17/70

Primary Examiner—Antonio F. Guida
Assistant Examiner—D. L. Weinhold
Attorney, Agent, or Firm—Brown & Martin

[57] ABSTRACT

A fish retainer comprising a combination of a support for a fish such as a board or table top and an anchor for yieldingly holding the fish on the top surface of the support when it is desirable to skin, fillet or scale the fish. The anchor includes a stem which extends rearwardly through the mouth of the fish and the free end of the stem abuts the rear wall of the stomach cavity of the fish. The stem forces the fish against the support.

11 Claims, 5 Drawing Figures

ANCHOR FOR HOLDING A FISH WHILE WORKING ON THE SAME

CROSS REFERENCE TO RELATED APPLICATION

The present application is a continuation-in-part of the inventor's copending application Ser. No. 42,820 filed June 2, 1970, which was a continuation-in-part of application Ser. No. 761,227 filed Sept. 20, 1968, now abandoned.

BACKGROUND OF THE INVENTION

1. Field of the Invention

The prior art includes such patents as Pomrenke No. 2,680,878; Willis No. 2,834,981; Hartman No. 2,863,165; Schuls No. 2,891,275; Anderson No. 3,177,523; Wilborn No. 3,248,751; Berg No. 2,974,357; and Reutz No. 3,015,841.

2. Description of the Prior Art

While these patents show stems extending into the body of the fish, they do not show such stems fastened to a support and disposed so as to resiliently hold the fish on the top surface of the support.

SUMMARY OF THE INVENTION

The anchor includes a stem which entends through the mouth of the fish and the free end of the stem abuts the rear wall of the stomach cavity of the fish. The stem is held in place on a support such as a board or table and is spaced at such distance above the board that when the fish is pushed about the stem, the flesh of that side of the fish that confronts the board is forced against the board. In one aspect of the invention, the stem is supported on the board by a resilient and flexible means such as a vacuum cup.

Other features and the advantages of the present invention will be apparent from the following description, reference being made to the accompanying drawing wherein preferred embodiments of the invention are illustrated.

DESCRIPTION OF THE PREFERRED EMBODIMENTS

Figure 3:
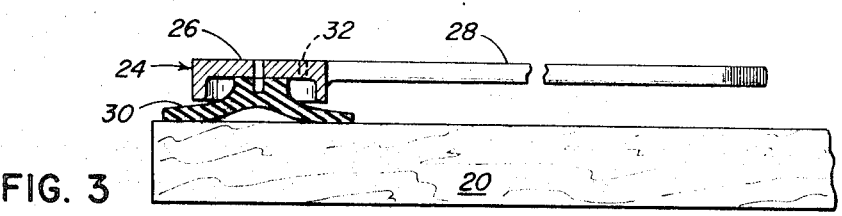
FIG. 3 is a sectional view taken along line 3—3 of FIG. 2, sans the fish.

The support 20 may be a work bench, table top, etc. It supports the fish 22 which is to be scaled, skinned or filleted.

The anchor 24 comprises a head 26 and a stem 28. The anchor can be affixed in any suitable manner to the support 20 with the stem spaced above the support. In the preferred embodiment, the anchor head is fixed to a plurality of suction cups 30 for removably fastening the head and stem to the support. The stem extends substantially parallelly of the top surface of the support. The cups 30 are formed of flexible and resilient rubber or synthetic rubber.

These anchors 24 are to be made in various sizes so that they are suitable for various sizes of fish, the object being that a size will be selected in which the stem, when in the fish, yieldingly compresses the flesh 25 of the body of the fish downwardly onto the top surface of the support. Obviously, the heights of the heads 26 and the lengths of the stems 28 would vary in the set of anchors. The user will select an anchor of the proper size to assure that the flesh of the body is yieldingly pressed against the top surface of the support 20.

After the proper size anchor is selected, the stem 28 of the anchor 24 is inserted into the fish 22 through the mouth of the fish and then the head 26 of the anchor is forced downwardly onto the top surface of the support 20, or, preferably, the anchor is first fastened to the support and then the fish is pushed about the stem while being forced downwardly onto the support 20. In either case, one of the two wider sides of the fish is urged against the support. Preferably, the stem is of sufficient length so that it extends rearwardly throughout the length of the stomach cavity 34 and the free end of the stem abuts the rear end wall of the cavity; and in the preferred embodiment, since the cups 30 are formed of resilient material, the stem will resiliently assist in compressing the flesh of the fish against the support. A side of the fish is shown at 36 and ribs are shown at 38.

In scaling, the scaling instrument is used in the normal way, i.e., by pulling it toward the head of the fish. The free end of the stem 28 of the anchor 24 abuts that portion of the fish which lies immediately rearwardly of the stomach cavity of the fish for limiting movement of the fish upwardly and to the left, as viewed in the drawing. After one side of the fish is scaled, it is removed from the stem and then the other wider side is turned toward the support 20 and then the fish pushed to receive the stem 28 through the mouth of the fish. Or when one side of the fish is scaled, it may be merely rotated about the stem 28 to expose the other wider side for scaling, thus eliminating the necessity of removing the fish from the stem prior to completion of the scaling.

Figure 1:
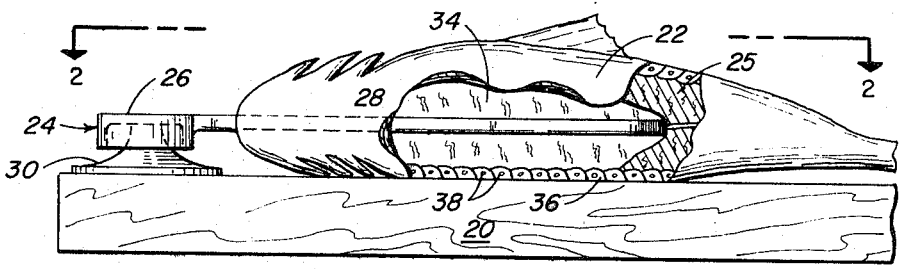
FIG. 1 is a side view of a board carrying the anchor and also showing part of the fish in section to show the stomach cavity of the fish.
Figure 2:
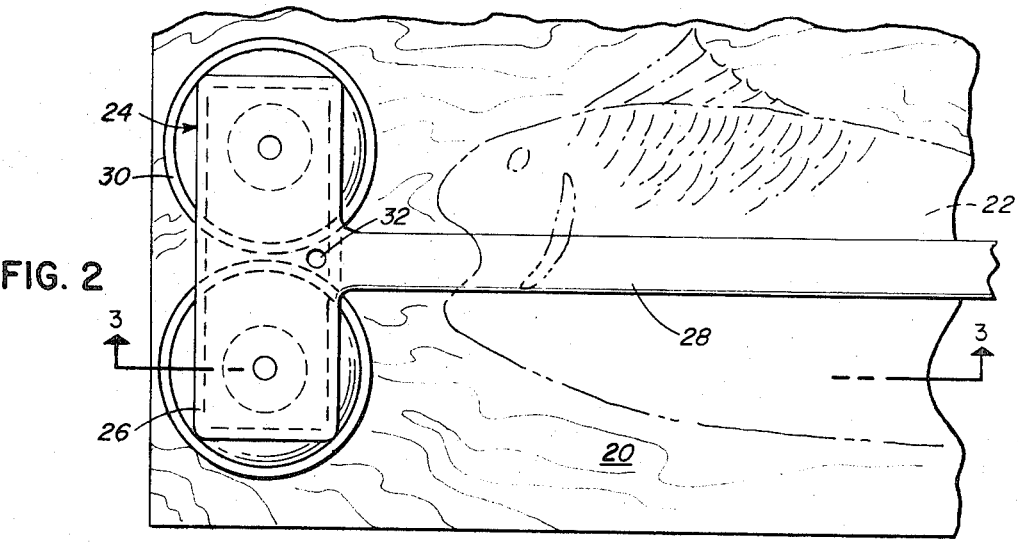
FIG. 2 is a top plan fragmentary view of the board, the anchor and the fish.
Figure 5:
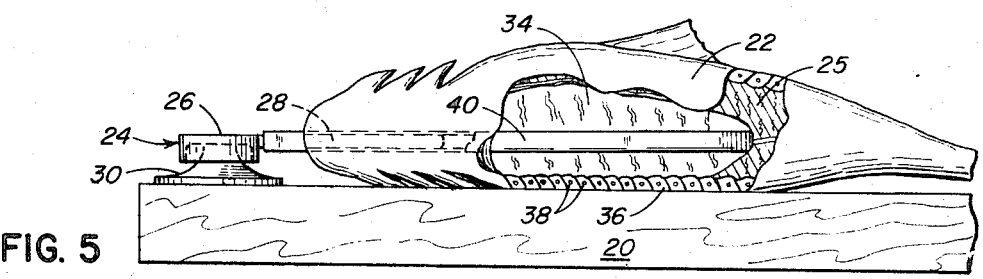
FIG. 5 is a view which is similar to FIG. 1, but showing the embodiment disclosed in FIG. 4.

Skinning, scaling or filleting of the fish is performed with the fish in the positions shown in FIGS. 1, 2 and 5.

It is desirable in most cases to hold the tail end of the fish with one hand and the other hand is available for manipulating the scaling instrument. Since the free end of the stem is in abutting relationship with that portion of the fish which lies rearwardly of the stomach cavity of the fish, and since the body of the fish is yieldingly urged against the table, the fish is held sufficiently stable on the support for the ready, for example, scaling of the exposed areas thereof.

It will be observed from FIGS. 1 and 2 that the stem 28 is wider horizontally than vertically, and it will be observed from FIG. 5 that the stem and the member 40 are wider horizontally than vertically. A hole 32 in the head 26 of the anchor 24 can be used for hanging the anchor when it is not in use. This hole can be used also for receiving a member such as a nail driven in the support 20 to augment the cups in retaining the anchor in position on the support.

Figure 4:
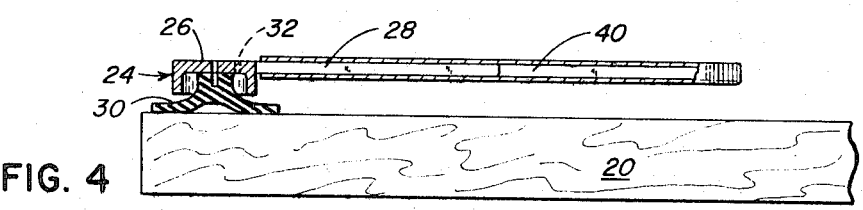
FIG. 4 is a view which is similar to FIG. 3, but showing another embodiment of the invention.

Referring now to the embodiment shown in FIGS. 4 and 5, an elongated member 40 is in telescopic relationship with the stem. Preferably, the member 40 is hollow and the stem 28 extends into the member. In this manner, a kit embodying one anchor 24 and one member 40 provides for yieldingly retaining various size fish against the board. Obviously, several members like member 40, but of various lengths, can be included in the kit.

It is to be understood that the vacuum cups are merely illustrative of one form of removably attaching the anchor 24 to the support 20. It is also to be understood that one unit, including an anchor and a telescoping member such as member 40, is not intended to be used for all sizes of fish. For example, one unit may comprehend a stem 28 that is held on the support in any suitable manner, and that is spaced from the support at such distance that when a sunfish or bluegill, etc., having a length of 4 to 8 inches is pushed about the stem, the flesh of the fish is forced against the support. That unit will also include a telescoping member that extends to abutting relationship with the rear wall of the stomach cavity for fish of larger size, for example, 8 inches to 16 inches, such as bass, ring perch, etc. In either event, i.e., the use of the retainer for small or for larger fish, the stem 28 is at such height above the support that the fish must be forced about the stem. Too, the stem or the member 40 should be of such length that it can abut the rear end wall of the stomach cavity and the nose of the fish should be to the right of the head of the anchor.

Having described my invention, I claim:

1. A retainer for holding a fish to be scaled, which retainer is attachable to a horizontally disposed support such as a board or the like, the retainer comprising in combination:
   A. an anchor including:
   1. an elongated stem of such length that when inserted into the fish through the mouth of the fish, the rear end thereof abuts the rear end wall of the stomach cavity of the fish,
   2. fastening means at the forward end of the stem fastening the stem to the support at a height at which, when the stem is within the fish, that side of the fish that confronts the support is urged against the support,
   3. the fastening means including resilient means for allowing up and down pivotal movement of the rear end of the stem relative to the fastening means,
   4. the resilient means normally biasing the rear end of the stem towards the side of the fish between the rear end and the support, against the support thereby anchoring the fish in position against the support at the rear end of the stem,
   5. and the length of the stem being such that when the rear end of the stem abuts the rear end wall of the stomach cavity of the fish, the front end of the fish is spaced from the fastening means.

2. A retainer as defined in claim 1, characterized in that the stem is wider horizontally than vertically.

3. A retainer as defined in claim 1, characterized in that the anchor includes:
   B. 3. an elongated member in telescopic relationship with the stem, the length of said member being such that, when the rear end thereof abuts the rear end wall of the stomach cavity of the fish, the front end of the stem lies forwardly of the front end of the fish.

4. A retainer as defined in claim 3, characterized in that the stem extends into the member.

5. A retainer comprising in combination:
   A. a support having a top surface for supporting a fish to be scaled, skinned or filleted;
   B. an anchor including:
   1. an elongated stem adapted to extend into the fish through the mouth of the fish and into the stomach cavity of the fish,
   2. fastening means at the forward end of the stem for fastening the stem to the support and for yieldingly urging the body of the fish against the support, said fastening means being resilient and flexible for yieldingly urging the free end of the stem downwardly,
   3. and the length of the stem being such that the free end abuts the rear end wall of the stomach cavity of the fish and the front end of the fish is adjacent but spaced from the fastening means.

6. A retainer as defined in claim 5, characterized in that the means includes:
   B. 2. a. resilient and flexible vacuum cup means.

7. A retainer as defined in claim 5, characterized in that the anchor includes:
   B. 3. an elongated member in telescopic relationship with the stem.

8. A retainer as defined in claim 5, characterized in that the fastening means (B) (2) is provided with a nail hole.

9. A retainer as defined in claim 6, characterized in that the flexible vacuum cup means includes two resilient and flexible vacuum cups.

10. A retainer as defined in claim 9, characterized in that the fastening means (B) (2) is provided with a nail hole.

11. A retainer as defined in claim 10, characterized in that the common axis of the cups is disposed at substantially right angles with respect to the elongated stem, and further characterized in that the nail hole is disposed between the cups.

* * * * *